(12) United States Patent
Nakamura

(10) Patent No.: US 6,316,850 B1
(45) Date of Patent: Nov. 13, 2001

(54) SMALL-SIZED MOTOR

(75) Inventor: Kazuo Nakamura, Matsudo (JP)

(73) Assignee: Mabuchi Motor Co., Ltd. (JP)

( * ) Notice: Subject to any disclaimer, the term of this patent is extended or adjusted under 35 U.S.C. 154(b) by 0 days.

(21) Appl. No.: 09/491,777

(22) Filed: Jan. 26, 2000

(30) Foreign Application Priority Data

Jan. 29, 1999 (JP) .................................................. 11/021212

(51) Int. Cl.$^7$ .................................................. H02K 33/10
(52) U.S. Cl. .................................. 310/40 MM; 310/261; 310/269
(58) Field of Search ............................ 310/238, 40 MM, 310/216, 261, 264, 269, 154, 51

(56) References Cited

U.S. PATENT DOCUMENTS

| | | | |
|---|---|---|---|
| 4,616,151 | * | 10/1986 | Pryjmak .................. 310/216 |
| 4,881,002 | * | 11/1989 | Yamaguchi ............... 310/261 |
| 5,528,096 | * | 6/1996 | Orii et al. ................ 310/237 |
| 5,982,055 | * | 11/1999 | Matsushita et al. ....... 310/40 MM |

* cited by examiner

*Primary Examiner*—Joseph Waks
(74) *Attorney, Agent, or Firm*—McGlew and Tuttle, P.C.

(57) ABSTRACT

A small-sized motor includes a rotor, which, in turn, includes a shaft, a laminated core forming salient magnetic poles an odd number and mounted on the shaft, windings, each being wound around a plurality of salient magnetic poles, and a commutator mounted on the shaft. Each salient magnetic pole includes an arm portion and wing portions, which are integrated with ends of the arm portion and circumferentially extends symmetrically with respect to the arm portion. When core laminations of the laminated core each has a thickness u, the laminated core has a diameter D, and the wing portion has a thickness t as measured at its root in a radial direction, the thickness t falls within the range from 5.5% the core diameter D as an upper limit to the core-lamination thickness u as a lower limit. Thus, it becomes possible to solve a problem of a rotor having an odd number of poles in that vibration is likely to arise, to thereby suppress vibration, while maintaining a feature of the rotor that a large torque can be produced.

4 Claims, 5 Drawing Sheets

17 Wing Portion
15 Annular Portion
16 Arm Portion

SMALL-SIZED MOTOR

TECHNICAL FIELD

The present invention relates to a small-sized motor and particularly to a small-sized motor that suppresses vibration to thereby prevent emergence of a resonance peak.

BACKGROUND ART

A small-sized motor—which includes a cylindrical, metallic casing and magnets mounted on the inner surface of the casing and serving as stator-side magnetic poles—has been used to drive electric equipment for use in an automobile. Rotor-side magnetic poles of such a small-sized motor are of an odd or even number. For example, as shown in FIG. 8, in the case of a small-sized motor including right-hand and left-hand magnets 1 forming two stator-side magnetic poles, and a 5-pole, laminated core 8 forming rotor-side magnetic poles of an odd number, when one rotor-side magnetic pole is positioned on the X axis, the five rotor-side magnetic poles become asymmetrical with respect to the Y axis. However, when, as a result of rotational progress, one rotor-side magnetic pole comes to be positioned on the Y axis, the rotor-side magnetic poles become symmetrical with respect to the Y axis, as shown in FIG. 9. Repeatedly becoming symmetrical and asymmetrical according to rotation as viewed from the stationary-side magnetic poles, a rotor having an odd number of poles is not advantageous in terms of vibration.

By contrast, when two magnet-type magnetic poles are combined with a rotor having an even number of poles, for example, 6 poles, the rotor becomes symmetrical in any rotational position. Thus, the rotor having an even number of poles is advantageous in terms of vibration. However, when a small-sized motor employing a rotor having an odd number of poles and that employing a rotor having an even number of poles are compared under substantially the same conditions (motor size, voltage, and current, among others), the rotor having an odd number of poles is conventionally known to exhibit a larger torque. The small-sized motor employing a rotor having an even number of poles may raise a cogging problem.

A motor employing a rotor having an odd number of poles is advantageously applicable to fields requiring a large torque, and, at the same time, is required to suppress an inherent vibration problem. Conventionally, the profile of a laminated core has not been considered from the viewpoint of suppression of vibration. Specifically, the profile of the conventional laminated core shown in FIGS. 8 and 9; i.e., the width of arm portions 16, the thickness t of wing portions 17, and the distance between the adjacent wing portions 17, constituting salient magnetic poles of the rotor have not been considered from the viewpoint of suppression of vibration.

DISCLOSURE OF THE INVENTION

An object of the present invention is to provide a small-sized motor capable of solving a problem of a rotor having an odd number of poles in that vibration is likely to arise, to thereby suppress vibration while maintaining a feature of the rotor that a large torque can be produced.

A small-sized motor of the present invention comprises a casing 2 having a closed-bottomed cylindrical shape and including a magnet 1 attached to an inner surface thereof; a casing cover 5 fitted to the casing 2 so as to close an opening portion of the casing 2 and including a brush attached thereto; and a rotor including a shaft 7, a laminated core 8 forming salient magnetic poles of an odd number and mounted on the shaft 7, windings 9, each being wound around a plurality of salient magnetic poles, and a commutator 10 mounted on the shaft 7. Each salient magnetic pole includes an arm portion 16 and wing portions 17, which are integrated with ends of the arm portion 16 and circumferentially extends symmetrically with respect to the arm portion 16. Core laminations of the laminated core 8 are blanked from a silicon steel sheet through press-working. When the core laminations each have a thickness u, the core 8 has a diameter D, and the wing portion 17 has a thickness t as measured at its root in a radial direction, the thickness t falls within a range the upper limit of which is 5.5% the core diameter D and the lower limit of which is the core-lamination thickness u. Through employment of such a range of the thickness t, vibration can be suppressed.

According to the small-sized motor of the present invention, the distance v between adjacent ends of the wing portions 17 is selected so as to be not less than 1.2 times a wire diameter of winding and such that [distance v/diameter D×(the number of poles)] is not greater than 0.22, thereby effectively suppressing vibration further.

According to the small-sized motor of the present invention, the ratio of the width w of the arm portion 16 to the core diameter D is 0.14 to 0.16, thereby effectively suppressing vibration further.

BEST MODE FOR CARRYING OUT THE INVENTION

Figure 1:
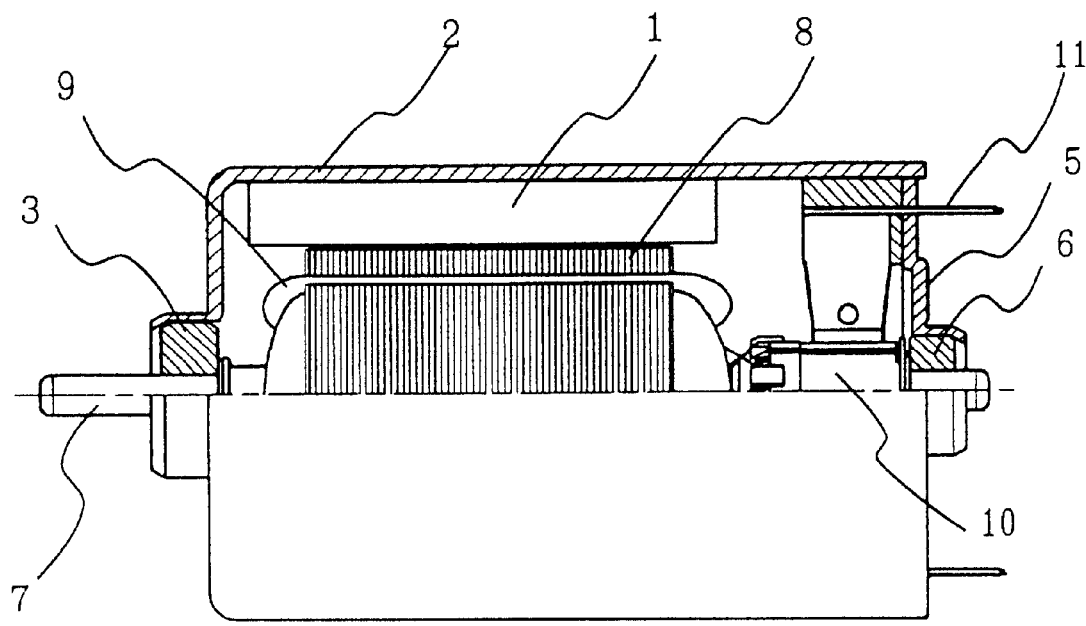
FIG. 1 is a longitudinal sectional view of a small-sized motor of the present invention, sectionally showing the upper half of the motor.
Figure 2:
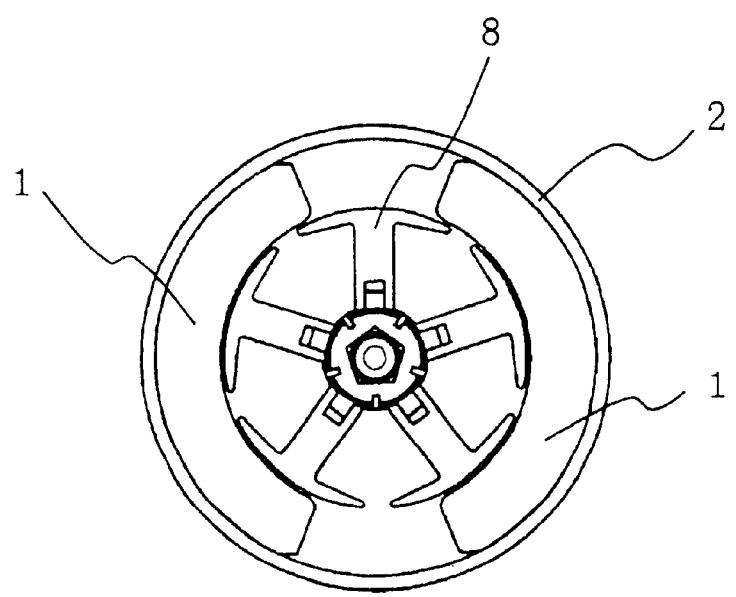
FIG. 2 is a transverse sectional view of the small-sized motor of FIG. 1, showing arrangement of rotor-side and stator-side magnetic poles.

FIG. 1 is a longitudinal sectional view of a small-sized motor of the present invention, sectionally showing the upper half of the motor. FIG. 2 is a transverse sectional view of the small-sized motor of FIG. 1, showing arrangement of rotor-side and stator-side magnetic poles. Magnets 1 are attached to the inner surface of a casing 2, which is formed of a metallic material and into a closed-bottomed cylindrical shape. A casing cover 5 is fitted to the casing 2 so as to close an opening portion of the casing 2. A bearing 6 for a shaft 7 is mounted at a central portion of the casing cover 5. The other end of the shaft 7 is supported by a bearing 3, which is disposed at the center of a bottom portion of the casing 2 having a closed-bottomed cylindrical shape.

The shaft 7 is equipped with a laminated core 8, which assumes a profile that characterizes the present invention and which will be described in detail later, windings 9 wound around the laminated core 8, and a commutator 10, thereby forming a rotor of the small-sized motor. The windings 9 of the present invention are each wound around a plurality of poles. In the case of an odd number of poles equal to or greater than 5 poles, each winding 9 is wound around a plurality of poles, such as 2 poles or 3 poles, in order to minimize variations in voltage or current, which alternates on the commutator. Through employment of such a practice of winding around a plurality of poles, a wide angle range is covered, thereby smoothing varying magnetic flux and thus providing advantage with respect to suppression of vibration.

Brushes in contact with the commutator 10 are supported by the casing cover 5 as practiced conventionally. Input terminals 11 connected to the brushes extend through the casing cover 5 and are projected to the outside for electrical connection.

Figure 3:
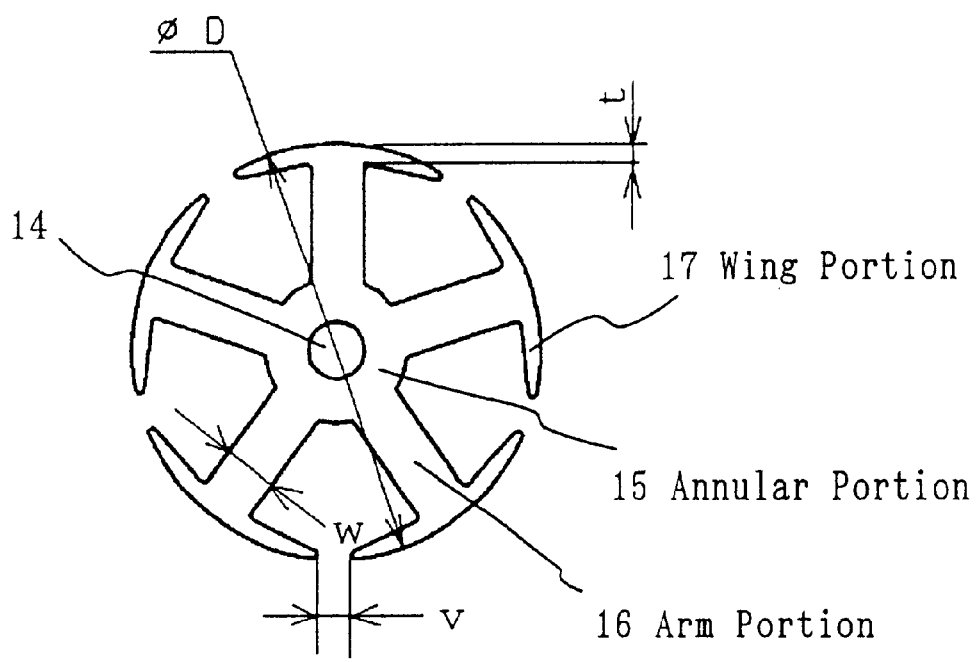
FIG. 3 is a view of a laminated core of the present invention forming five salient magnetic poles.
Figure 4:
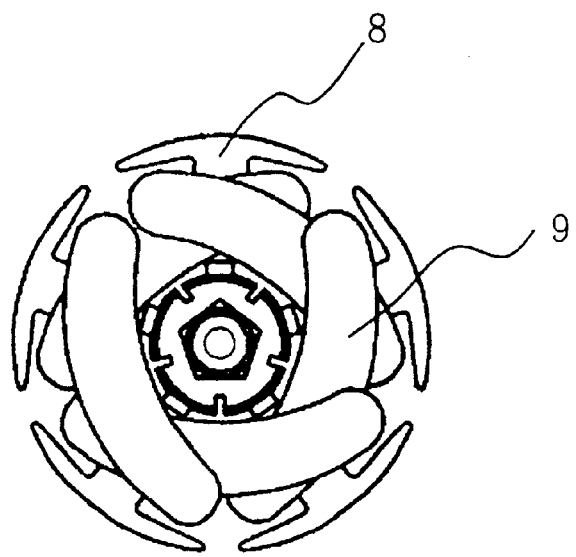
FIG. 4 is a view of windings, each being wound around two poles of the laminated core of FIG. 3, as viewed from the commutator.

FIG. 3 exemplifies a laminated core of the present invention which forms five salient magnetic poles. FIG. 4 is a view of windings 9, each being wound around two poles of the laminated core of FIG. 3, as viewed from the commutator 10. As practiced conventionally, core laminations of the laminated core 8 are blanked from a silicon steel sheet into a predetermined profile through press-working and are then laminated into the laminated core 8. The laminated core 8 includes an annular portion 15 and arms as many as salient magnetic poles and extending radially from the annular portion 15. The annular portion 15 has a shaft hole 14 formed therein at the center. The shaft 7 is fitted into the shaft hole 14. Wing portions 17 are formed at ends of the arm symmetrically with respect to the arm. In this laminated core, the core diameter is represented by the letter D, and the thickness of the wing portion 17 as measured radially at its root (a portion integrated with the arm) is represented by the letter t. Conventionally, a radius "R" is imparted to the root in order to increase mechanical strength. The wing thickness t excludes "R."

Figure 5:
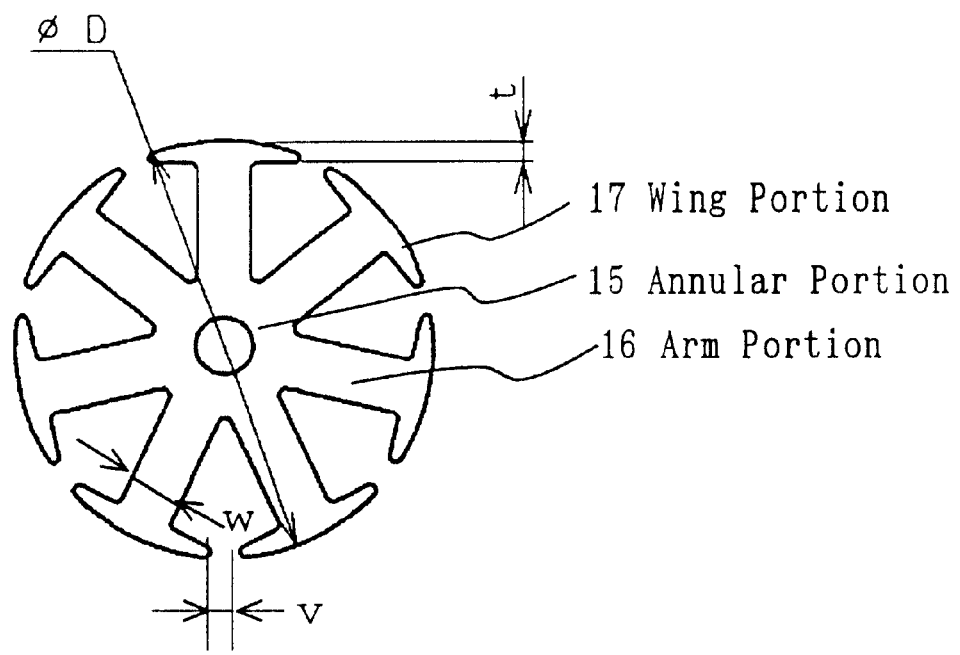
FIG. 5 is a view similar to that of FIG. 3, showing the case of seven salient magnetic poles.
Figure 6:
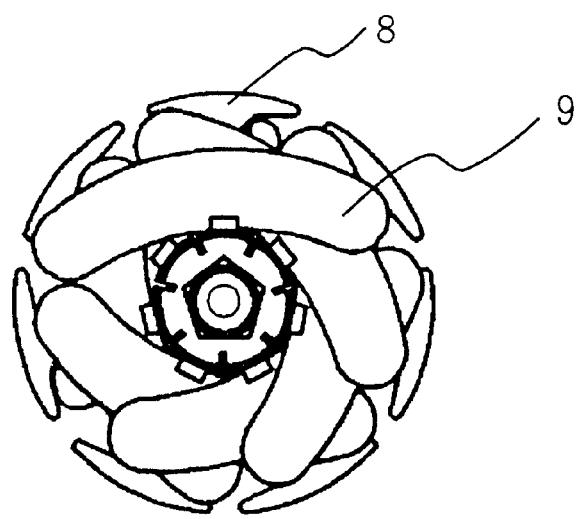
FIG. 6 is a view similar to that of FIG. 4, showing the case of seven salient magnetic poles while windings are each wound around three poles.

FIGS. 5 and 6 are similar to FIGS. 3 and 4, but are different in that the number of salient magnetic poles is seven and that windings are each wound around three poles. Therefore, detailed description of the figures is omitted. In any case, the present invention is applicable to a small-sized motor having an odd number of salient magnetic poles and windings, each being wound around a plurality of poles.

TABLE 1

| Wing thickness (mm) | Wing thickness/diameter (%) | Resonance (G) |
| --- | --- | --- |
| 1.467 | 6.38 | 17 |
| 1.215 | 5.28 | 3.5 |
| 0.970 | 4.22 | 3.5 |
| 0.869 | 3.78 | 3.5 |

In application to such a small-sized motor, the present invention is characterized by the profile of the laminated core. First, by rendering thickness t of the wing portion 17 as thin as possible, vibration can be suppressed. Second, by narrowing distance v between adjacent wing portion ends as much as possible, vibration can be suppressed. Third, by selecting an optimum arm width w, vibration can be suppressed.

Figure 7:
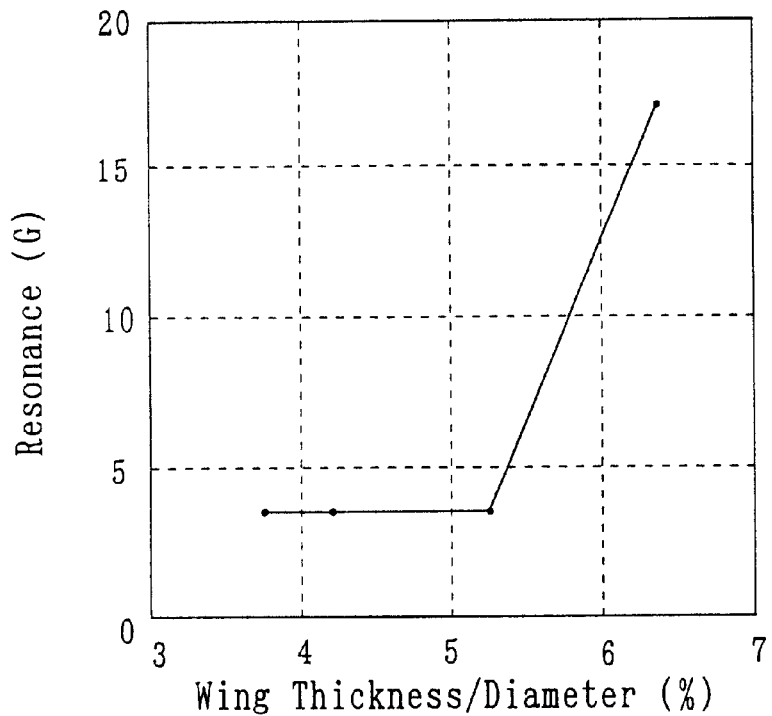
FIG. 7 is a graph showing the result of a measurement in which resonance was measured in terms of acceleration G while wing thickness is varied.
Figure 8:
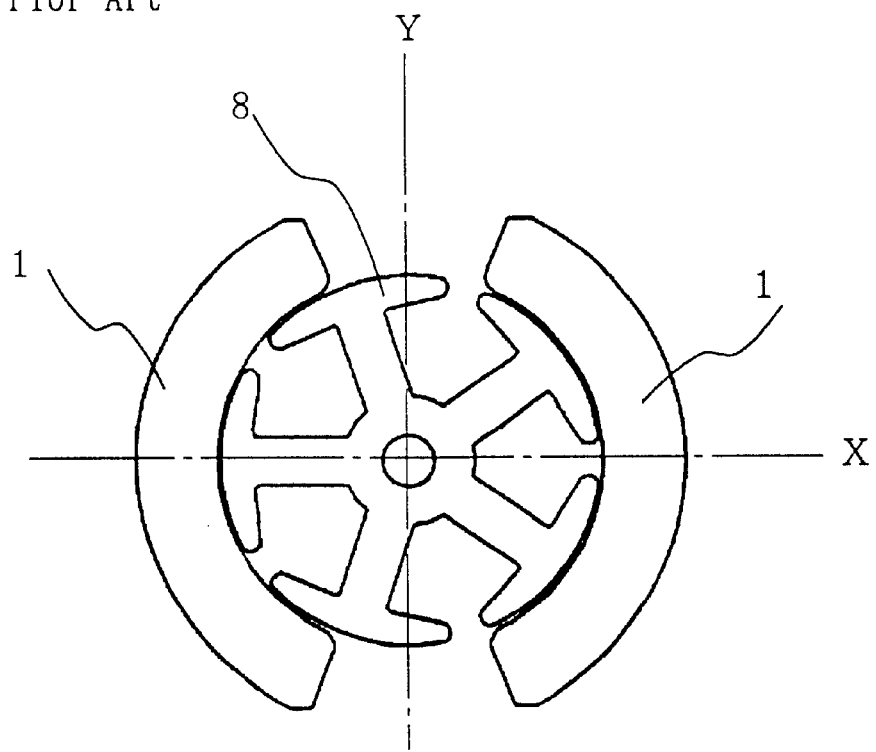
FIG. 8 is a view showing arrangement of two magnet-type magnetic poles and rotor-side magnetic poles of a conventional 5-pole laminated core.
Figure 9:
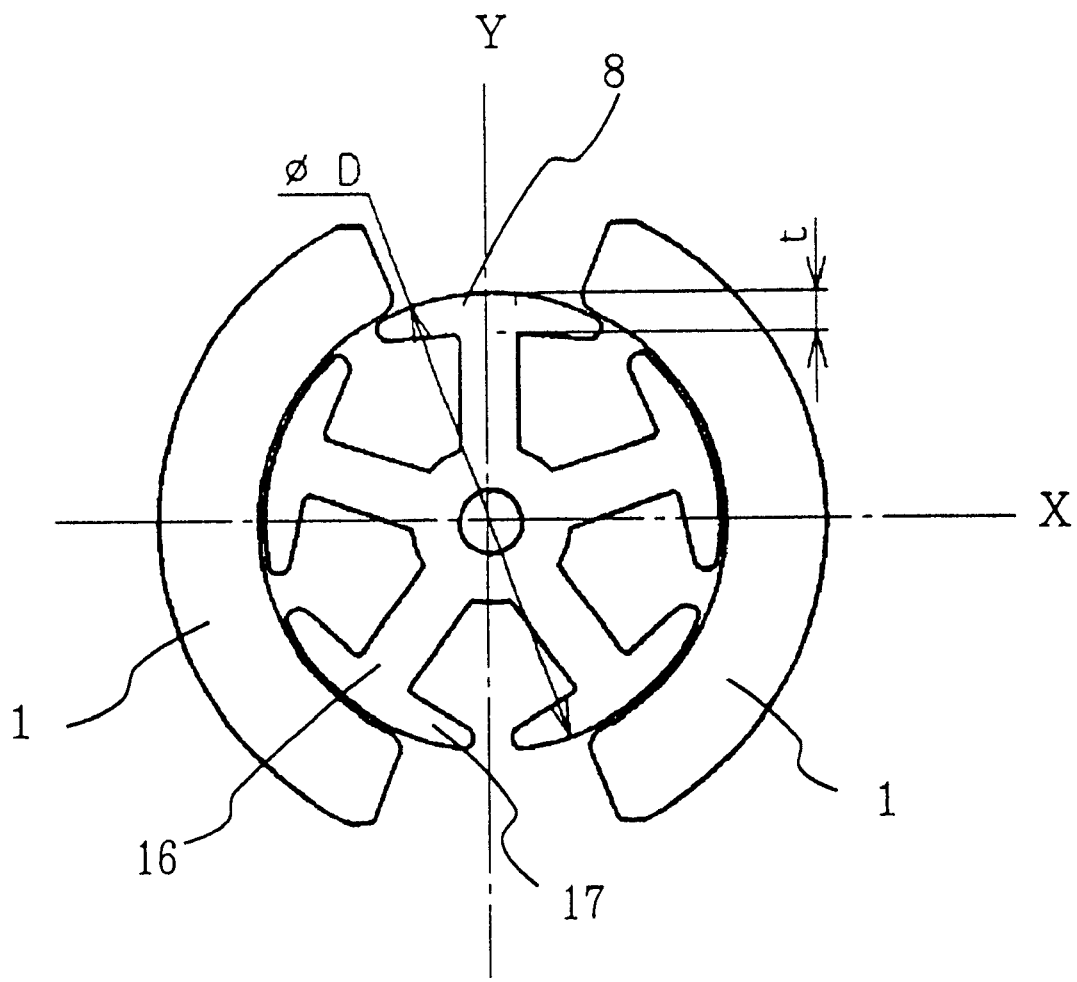
FIG. 9 is a view similar to that of FIG. 8, showing a state in which rotation has proceeded from the state of FIG. 8.

Table 1 shows the results of measuring resonance in terms of acceleration G with respect to cores having a diameter D of 23 mm, an arm width w of 3.4 mm, and different wing thickness. The measurement results are graphed in FIG. 7. As seen from the measurement results, through employment of a wing thickness/diameter of not greater than 5.5%, vibration can be sufficiently suppressed.

The lower limit of the wing thickness depends on machining accuracy. Core laminations of the laminated core are blanked from, for example, a silicon steel sheet having a thickness u of 0.35 mm or 0.5 mm. Accurate blanking of a core lamination having a wing thickness less than this sheet thickness u is difficult to perform through a single step blanking. Performance of blanking in two or more steps results in an increased number of press steps and causes a decrease in core strength along the shaft direction. Therefore, the wing thickness t is at least the thickness u of a silicon steel sheet used, preferably at least 1.5 times the thickness u, to thereby accomplish accurate blanking.

TABLE 2

| Wing thickness = 1.467 mm<br>Arm width = 3.0 mm | Average of maximum magnetic forces (gf) | |
| --- | --- | --- |
| Number of poles = 5<br>Diameter = 23 mm | X direction | Y direction |
| Tested core (1) | 38 | 119 |
| Distance between wing ends = 0.5 mm<br>Distance/diameter × number of poles = 0.109<br>Tested core (2) | 55 | 148 |
| Distance between wing ends = 1.0 mm<br>Distance/diameter × number of poles = 0.217<br>Tested core (3) | 109 | 195 |
| Distance between wing ends = 1.6 mm<br>Distance/diameter × number of poles = 0.348 | | |

Resonance (G) was measured while the distance v between adjacent wing portion ends was varied. The results of measurement revealed that the narrower the distance v, the more effectively resonance (G) is suppressed. Table 2 above shows the results of measuring a magnetic force in the X and Y directions, which will induce motor resonance. Ideally, a motor has a symmetrical profile with respect to its shaft so that no magnetic force arises in either the X or Y direction. Through minimization of such a magnetic force, motor resonance can be reduced.

TABLE 3

| | Average of maximum magnetic forces (gf) | |
| --- | --- | --- |
| | X direction | Y direction |
| Core of present invention | 36 | 57 |

Wing thickness/diameter =
0.970 mm/23 mm = 4.22%
Arm width = 3.4 mm
Arm width/diameter = 3.4/23 = 0.15
Distance between wing ends = 0.5 mm TABLE 3-continued

|  | Average of maximum magnetic forces (gf) | |
| --- | --- | --- |
|  | X direction | Y direction |
| Conventional core | 107 | 173 |

Wing thickness/diameter =
1.467 mm/23 mm = 6.38%
Arm width = 3.0 mm
Arm width/diameter = 3.0/23 = 0.13
Distance between wing ends = 2.1 mm As seen from the above table, the narrower the distance between the wing ends, the smaller the magnetic force. However, winding work is disabled unless the distance between the wing ends is at least as large as the wire diameter of winding. That is, the distance v between the wing ends is desirably as narrow as possible so long as winding work is not hindered. The distance v is selected so as to be not less than 1.2 times a wire diameter of winding and such that [distance v/diameter D×(the number of poles)] is not greater than 0.22, thereby sufficiently suppressing resonance.

Further, resonance (G) was measured while the arm width w was varied. The results of measurement revealed that, as the arm width w increases, resonance (G) is suppressed more effectively. However, as seen from the core profile, an increase in the arm width w causes a reduction in space for winding, resulting in a failure to obtain a sufficient torgue. From the viewpoint of obtainment of high torque, the arm width w is desirably narrowed so long as resonance is sufficiently suppressed. The arm width w is selected such that the value of arm width/diameter is 0.14 to 0.16, thereby suppressing vibration and obtaining sufficiently high torque.

Table 3 above shows the results of measuring a magnetic force in the X and Y directions with respect to a small-sized motor of the present invention, and compares the measurements with those of a conventional small-sized motor. As seen from Table 3, the present invention is considerably improved in terms of magnetic force.

INDUSTRIAL APPLICABILITY

As described above, according to the present invention, the radially measured thickness t of the wing portion 17 falls within the range from 5.5% the core diameter D as an upper limit to the core-lamination thickness u as a lower limit, thereby suppressing vibration while maintaining a feature of a rotor having an odd number of poles that a large torque can be produced.

According to the present invention, the distance v between adjacent ends of the wing portions 17 is selected so as to be not less than 1.2 times a wire diameter of winding and such that [distance v/diameter D×(the number of poles)] is not greater than 0.22, thereby effectively suppressing vibration further.

According to the present invention, the ratio of the width w of the arm portion 16 to the core diameter d is 0.14 to 0.16, thereby effectively suppressing vibration further.

What is claimed is:

1. A small-sized motor, comprising: a casing having a closed-bottomed cylindrical shape and including a magnet attached to an inner surface thereof; a casing cover fitted to said casing so as to close an opening portion of said casing and including a brush attached thereto; and a rotor including a shaft, a laminated core forming salient magnetic poles of an odd number and mounted on the shaft, windings, each being wound around a plurality of salient magnetic poles, and a commutator mounted on the shaft, wherein each salient magnetic pole includes an arm portion and wing portions, which are integrated with ends of the arm portion and circumferentially extends symmetrically with respect to the arm portion; and when the laminated core blanked from a silicon steel sheet having a thickness u through press-working has a diameter D, and the wing portions have a thickness t as measured at its root in a radial direction, the thickness t falls within a range the upper limit of which is 5.5% the core diameter D and the lower limit of which is the sheet thickness u.

2. A small-sized motor as described in claim 1, wherein the ratio of the width w of the arm portion to the core diameter D is 0.14 to 0.16.

3. A small-sized motor as described in claim 1, wherein the distance v between adjacent ends of the wing portions is selected so as to be not less than 1.2 times a wire diameter of winding and such that [distance v/diameter D×(the number of poles)] is not greater than 0.22.

4. A small-sized motor as described in claim 3, wherein the ratio of the width w of the arm portion to the core diameter D is 0.14 to 0.16.

* * * * *